United States Patent [19]
Marcell

[11] 3,886,679
[45] June 3, 1975

[54] FISH BAIT DISPENSER

[76] Inventor: Sam A. Marcell, 8532 Troy, Lemon Grove, Calif. 92045

[22] Filed: July 3, 1974

[21] Appl. No.: 485,458

[52] U.S. Cl. .......................................... 43/55; 43/56
[51] Int. Cl. ............................................ A01k 97/04
[58] Field of Search ................... 43/55, 56; 221/256; 222/358, 288, 363, 196, 191, 164, 575, 567, 558; 220/85 H, 288, 291

[56] References Cited
UNITED STATES PATENTS

| | | | |
|---|---|---|---|
| 986,229 | 3/1911 | Seeger | 43/56 |
| 1,556,127 | 10/1925 | Pruett | 43/55 |
| 2,884,736 | 5/1959 | Harrell | 43/56 |

Primary Examiner—Louis G. Mancene
Assistant Examiner—Peter Skiff
Attorney, Agent, or Firm—Ralph S. Branscomb

[57] ABSTRACT

A fish bait dispenser which attaches to the belt or other clothing of the fisherman and holds an upright bait jar which will normally contain salmon eggs. A pivotal lid on the unit normally covers the mouth of the jar, and upon opening the lid, a spatula attached to the underside of the lid lifts one or more eggs into an exposed position so that the fisherman can engage an egg directly on his fish hook.

9 Claims, 4 Drawing Figures

FISH BAIT DISPENSER

BACKGROUND OF THE INVENTION

Salmon eggs are very commonly used as fish bait and are commercially available in small narrow-mouthed jars in most bait and fishing tackle stores. The eggs are generally removed one or several at a time by the fisherman with his fingers at the fishing site which can prove to be a tedious operation, especially if the fisherman is standing in the water, since he must manage his rod, hook, bait jar and jar top simultaneously. In addition, the eggs are generally packed in a slimy matrix which is not only messy when the eggs are repeatedly handled but is offensive to squeamish fisherman, especially ladies.

SUMMARY OF THE INVENTION

It is the object of this invention to provide an apparatus which will fasten onto the fisherman's clothing at about waist level and dispense salmon eggs or the like from a jar one or several at a time and permit the fisherman to directly engage an egg on his hook without touching the bait.

Structurally the unit comprises a mounting bracket with means of mounting same on the belt or pants of the user and a threaded annular lip in which is screwed a jar of salmon eggs. A spring-loaded lid pivotally mounted atop the annular lip opens to permit access to the mouth of the jar and carries a diagonally depending spatula which engages one or more eggs when the lid is closed and presents them to the fisherman on the substantially horizontal spatula surface when the lid is opened. A handle is provided to facilitate opening of the lid.

DETAILED DESCRIPTION OF THE PREFERRED EMBODIMENT

Figure 1:
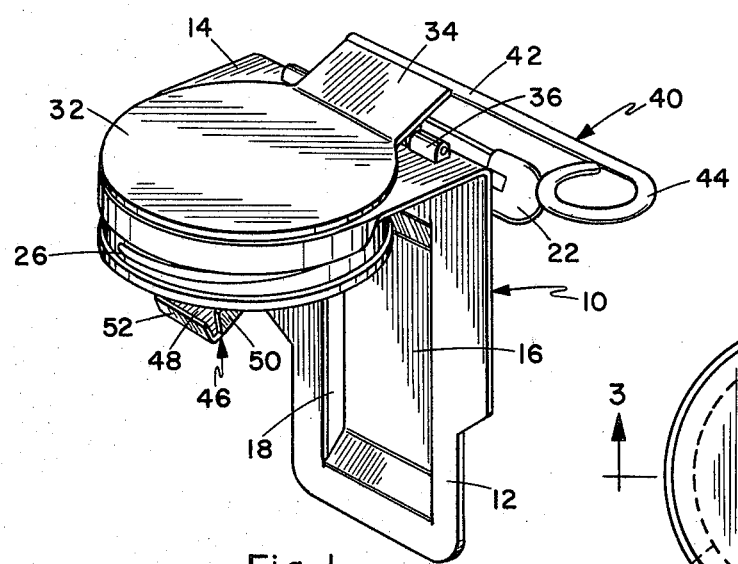
FIG. 1 is a perspective view of the fish bait dispenser.
Figure 2:
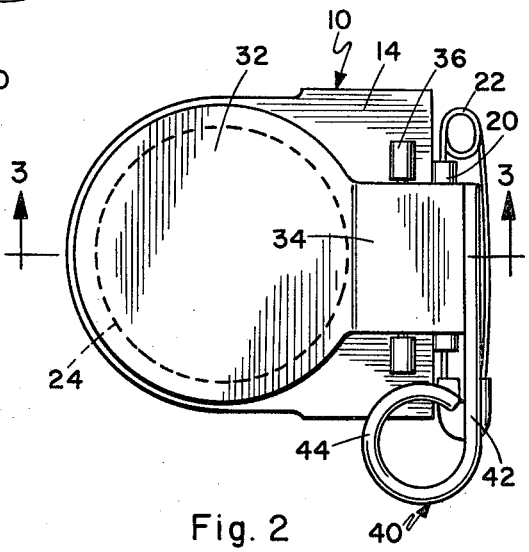
FIG. 2 is a top plan view thereof.
Figure 3:
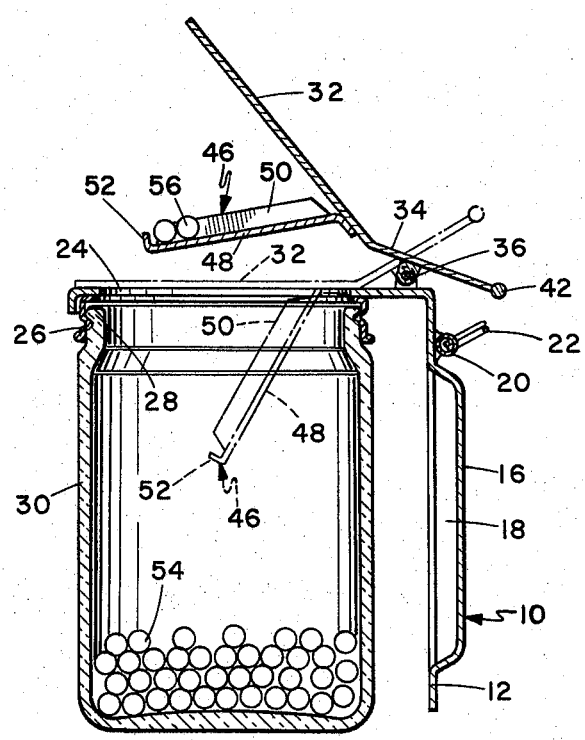
FIG. 3 is a sectional view taken on line 3—3 of FIG. 2.
Figure 4:
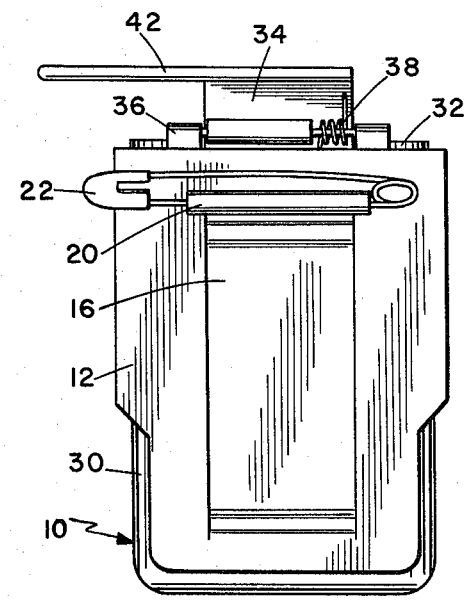
FIG. 4 is a rear elevation view thereof.

The dispenser comprises a mounting bracket 10 having vertical and horizontal portions 12 and 14 respectively, the orientation being taken from FIG. 1. The vertical portion has a rearwardly struck central section 16 which defines a part of vertical slots 18 through which a belt can be inserted in obvious fashion to secure the structure to the waist of the user. Above the struck section 16 is mounted a horizontal sleeve 20 which carries the shank portion of a safety pin 22. The safety pin is snugly received in the sleeve so that it may be pivoted upwardly against the mounting bracket when not in use and remain in that position, as shown in FIG. 4, and swing out as in FIGS. 2 and 3 to engage on the trousers or shirt when no belt is worn.

The horizontal portion 14 of the bracket has a circular central opening 24 and mounted adjacent the opening is a dependent annular lip 26 having interior threads to receive the threaded rim 28 of a bait jar 30. Clearly the top of the jar must be removed prior to engaging the jar in the mounting bracket.

Disposed atop the horizontal portion 14 of the mounting bracket is a lid 32 dimensioned to cover the opening 24 and having an upwardly inclined rear flange 34 which is pivoted to the mounting bracket by a hinge 36 such that when in the lowered position of FIG. 1 the lid lies flush on the bracket, and when in the uppermost position the lid falls short of being vertical. The hinge 36 is loaded with a spring 38 which biases the lid into the closed or lowered position.

Although the lid could clearly be opened by depressing the flange 34, it is preferable that some sort of handle be provided to simplify opening. In the disclosed version the handle 40 comprises a shaft 42 mounted near the hinge and parallel with the pivotal axis of the lid and having a forwardly bent loop 44 which can easily be rotated by the user to open the lid.

The principal feature of the invention is the bait-holding member 46 which is shown as a spatula 48 which is diagonally mounted to the underside of the lid and extends into the jar. The spatula has side flanges 50 and an upturned lip 52 at the end to retain one or more eggs thereon. The bait-holding member could be other than a spatula, it being contemplated that a spoon or similarly shaped member would function equally well.

In operation, the fisherman fastens the device to his belt or clothing and loads the dispenser with a jar of salmon eggs 54. As the eggs are needed, he twists the handle 40 to open the lid and as the lip opens the spatula scoops a few eggs. When the lid is open as far as possible, the flange 34 strikes the bracket and acts as a stop so that the spatula is substantially horizontal and presents a selection of a few eggs for the fisherman to spear individually with his hook. As the eggs are periodically withdrawn from the jar and the egg level falls below the spatula, it is necessary to swing the jar up sharply once or twice and more eggs will fall on the spatula. In this fashion all the eggs in the jar can be removed with the spatula most easily.

The bait holder can be made of sheet metal parts which are stamped, bent and then brazed or welded together in the configuration shown. The unit is thus inexpensive to produce, and of considerable utility to salmon egg fishermen. Although the unit is designed primarily for dispensing salmon eggs, it will operate equally well with other types of small bait which may be sold in a jar or simply loaded in the jar by the fisherman.

I claim:
1. A fish bait dispenser comprising:
   a. a mounting bracket for a bait jar;
   b. a lid pivoted to said mounting bracket to cover the mouth of said jar when in closed position and pivotable into an open position;
   c. bait-holding means mounted to said lid and extending into said jar when said lid is closed and capable of engagement with a portion of the bait in said jar;
   d. said bait holding means being carried by said lid to a position outside of said jar when said lid is pivoted into said open position.

2. Structure according to claim 1 and including means to fasten said mounting bracket onto the clothing of the user.

3. Structure according to claim 2 wherein said fastening means includes both belt-engaging slots in said bracket and a safety pin mounted on said bracket and attachable to the clothing of the user.

4. Structure according to claim 3 wherein said mounting bracket includes a sleeve and the shank portion of said safety pin is engaged in said sleeve to permit the pivoting of said pin against the mounting bracket when not in use.

5. Structure according to claim 1 wherein in normal use said mounting bracket maintains said jar in a substantially upright position and said bait holding means comprises a spatula extending diagonally into said jar and having an upturned lip at the distal end thereof to hold a bait portion thereon.

6. Structure according to claim 5 and including a stop means on said bait dispenser to prevent said lid from opening beyond the angle at which said spatula is substantially horizontal.

7. Structure according to claim 1 wherein said mounting bracket includes an interiorly threaded annular lip to engage the threaded rim of a bait jar.

8. Structure according to claim 1 and including a handle comprising a shaft parallel to and mounted adjacent to the pivotal axis of said lid, said shaft having an extended end adapted to be gripped and twisted by the user to facilitate opening of the lid.

9. Structure according to claim 7 and including a spring means to bias said lip into the closed position.

* * * * *